DAVID W. WASHBURN.
Improvement in Guides for Circular-Saws.

No. 114,235. Patented April 25, 1871.

United States Patent Office.

DAVID W. WASHBURN, OF BREWER, MAINE.

Letters Patent No. 114,235, dated April 25, 1871.

---

IMPROVEMENT IN GUIDES FOR CIRCULAR SAWS.

---

The Schedule referred to in these Letters Patent and making part of the same.

---

*To all whom it may concern:*

Be it known that I, DAVID W. WASHBURN, of Brewer, in the county of Penobscot and State of Maine, have invented a new and useful Guide for Saws; and I hereby declare the following to be a full, clear, and exact description of the same, which will enable others to make and use my invention, reference being had to the accompanying drawing forming part of this specification, in which—

Figure 1:
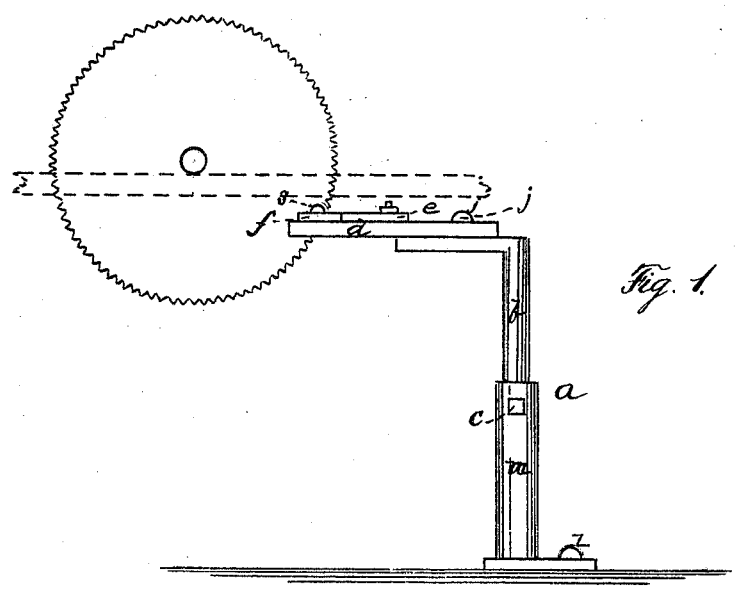

Figure 1 shows a side elevation, and

Figure 2:
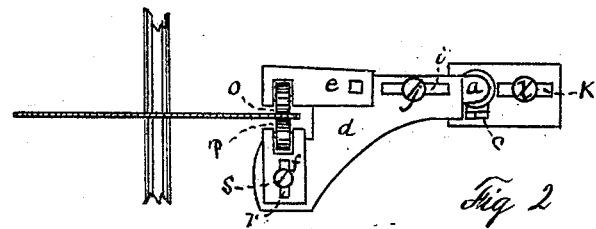

Figure 2 a plan of my invention.

Same letters show like parts.

The object of my invention is to furnish a simple and convenient guide to be applied to circular saws to insure their running straight through timber without "sheering," as they are apt to do if unprovided with any device of this nature. It can also be applied to sprung or "broken-backed" saws, and enables them to do good work.

I am aware that some devices of this nature have been used before, but mine is an improvement over all these in being very easy of application and adjustment.

In the drawing—

Fig. 1 at $a$ shows a standard, the upper part of which consists of a rod, $b$, sliding vertically in the lower part $m$, which is tubular, and secured at any desired height by means of a set-screw, $c$, in said part $m$.

To the top of the part $b$ is fastened the plate $d$, upon which are the guides $e$ $f$, placed one on each side of the saw near enough to it to keep it in one plane of motion.

This plate is capable of being moved toward or from the saw, as required, carrying the guides $e$ and $f$ with it. The position is regulated by the set-screw $j$ and slot $i$, securing it when required, and allowing it to fix the position of the guides $e$ $f$ in relation to the edge of the saw.

The guide $f$ is also provided with a slot, $r$, and set-screw, $s$, which permits it to be set as desired to regulate the distance between it and the opposite guide $e$, in which space the saw moves.

These guides $e$ and $f$, if desired, may be provided with small trucks, thus enabling them to be set close to the saw without impeding its speed by friction. They are lettered $o$ $p$ in fig. 2.

If it is necessary to remove the whole device from contact with the saw it can be done by loosening the set-screw $l$ at the foot of the standard $a$ and sliding said standard and its attachments back in the slot $k$, through which the set-screw $l$ passes, the whole being secured to the floor under the saw-table by this set-screw.

One great advantage of my device is the ease with which it can be applied to saws, it being complete in itself, requiring no fitting into place, since it can be quickly and easily set in place by the screw $l$, and as easily adjusted by the devices referred to and specified.

What I claim as my invention, and desire to secure by Letters Patent, is—

The within-described adjustable guide for saws, as specified, for the purposes set forth.

DAVID W. WASHBURN.

Witnesses:
WM. FRANKLIN SEAVEY,
FRED. FOSTER.